United States Patent [19]
Palma et al.

[11] Patent Number: 5,676,216
[45] Date of Patent: Oct. 14, 1997

[54] STRUCTURAL TWO-PIECE COMPOSITE INSTRUMENT PANEL CROSS-BEAM WITH INTEGRATED AIR DISTRIBUTION SYSTEM

[75] Inventors: Victor Jesse Palma, Walled Lake; Janis Kukainis, Northville, both of Mich.

[73] Assignee: Ford Global Technologies, Inc., Dearborn, Mich.

[21] Appl. No.: 567,570

[22] Filed: Dec. 5, 1995

Related U.S. Application Data

[63] Continuation of Ser. No. 227,773, Apr. 14, 1994, abandoned.
[51] Int. Cl.$^6$ ..................................................... B62D 25/14
[52] U.S. Cl. ........................... 180/90; 280/779; 280/752; 296/70
[58] Field of Search ..................................... 280/750, 751, 280/752, 779, 732, 748; 180/90; 296/70, 72, 192, 208; 454/69, 127

[56] References Cited

U.S. PATENT DOCUMENTS

| | | | |
|---|---|---|---|
| 3,724,357 | 4/1973 | Kavthekar et al. | 454/152 |
| 4,223,754 | 9/1980 | Mizuno et al. | 180/90 |
| 4,662,649 | 5/1987 | Ikeda et al. | 280/752 |
| 4,733,739 | 3/1988 | Lorenz et al. | 180/90 |
| 4,759,568 | 7/1988 | Paefgen et al. | 280/732 |
| 4,791,964 | 12/1988 | Van Kirk et al. | 138/115 |
| 4,811,760 | 3/1989 | Van Kirk et al. | 138/115 |
| 5,088,571 | 2/1992 | Burry et al. | 180/90 |
| 5,181,435 | 1/1993 | Khalifa et al. | 280/779 |
| 5,311,960 | 5/1994 | Kukainis et al. | 280/732 |
| 5,312,133 | 5/1994 | Pietila et al. | 180/90 |

FOREIGN PATENT DOCUMENTS

| | | |
|---|---|---|
| 2 230 775 | 1/1974 | Germany . |
| 58-112828 | 7/1983 | Japan . |
| 59-149812 | 8/1984 | Japan . |
| 59-230831 | 12/1984 | Japan . |
| 85-140405 | 4/1983 | U.S.S.R. . |

*Primary Examiner*—Paul N. Dickson
*Attorney, Agent, or Firm*—Damian Porcari

[57] ABSTRACT

A vehicular assembly incorporating knee bolsters and supporting the steering column. The assembly uses a beam fabricated largely from integrally injection molded plastic that is capable of reinforcing the knee bolsters, supporting the instrument panel and forming the ducts of an air distribution system. In the event of a collision, the knee bolster plates are stabilized so that they can cushion and limit the movement of the knees of a driver or passenger. The beam supports the steering column of the vehicle so that the first bending mode frequency of the combination of the steering wheel and the beam is greater than the first bending mode frequency of the body and is different from the idle excitation frequency of an engine employed in the vehicle.

10 Claims, 9 Drawing Sheets

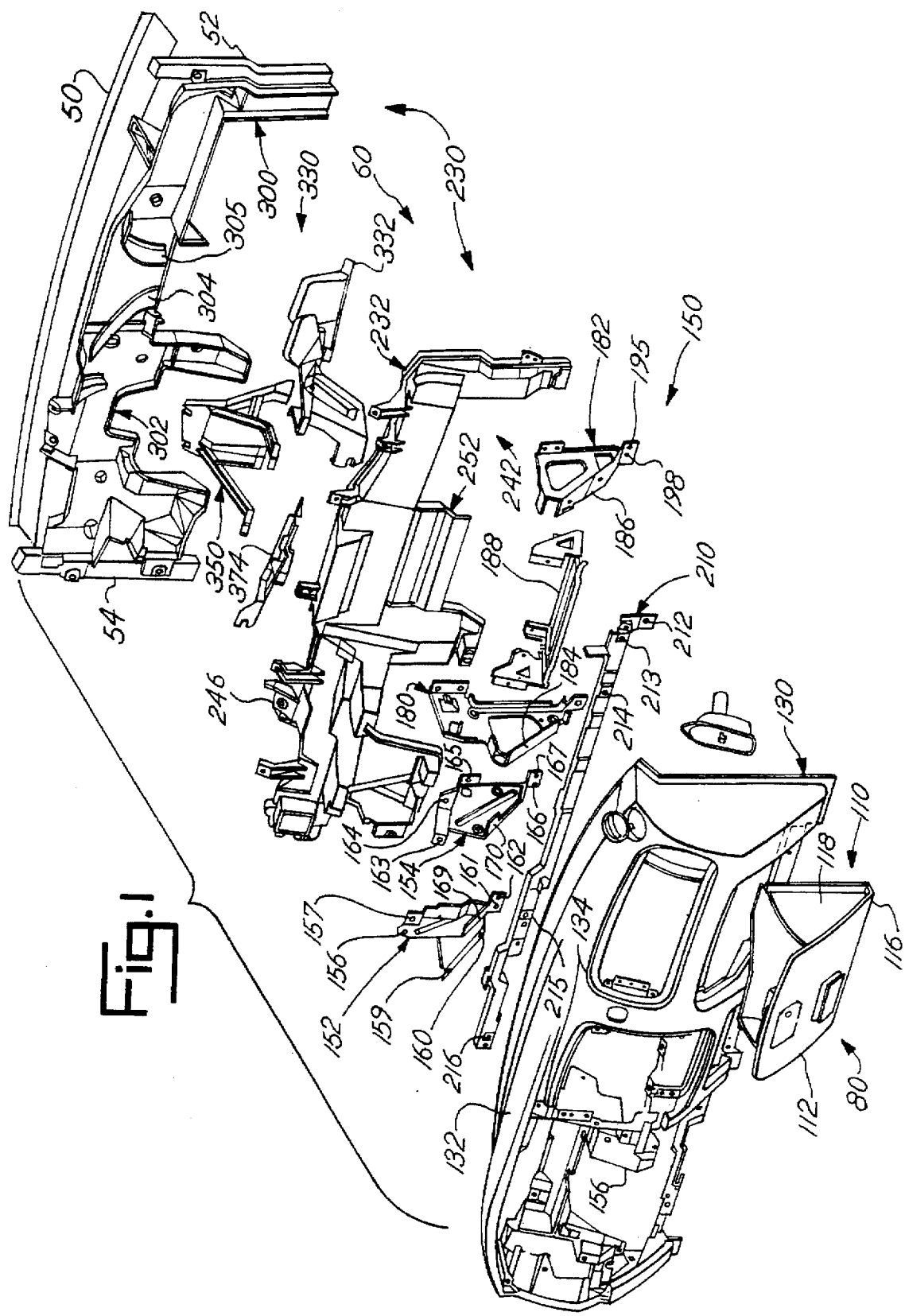

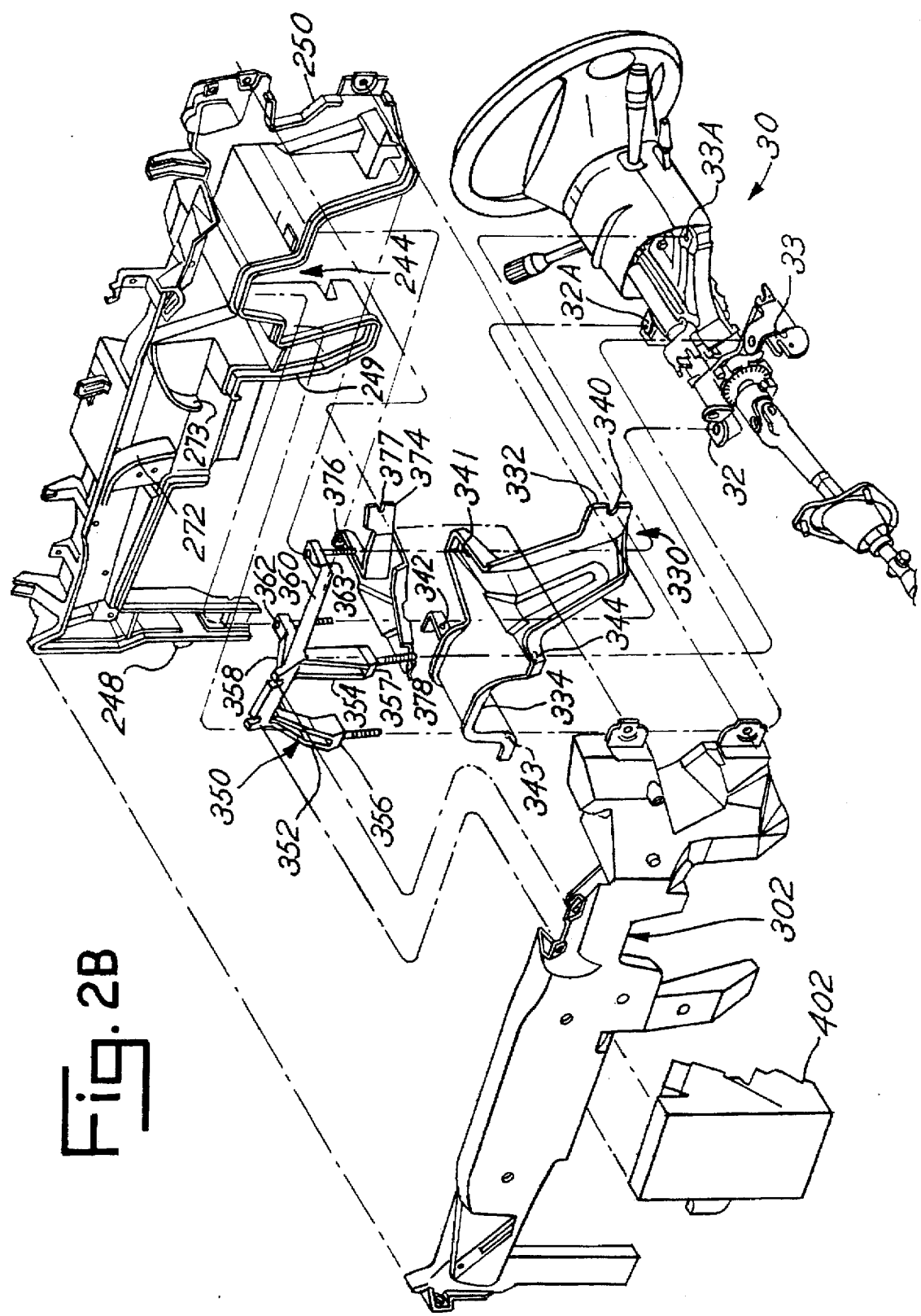

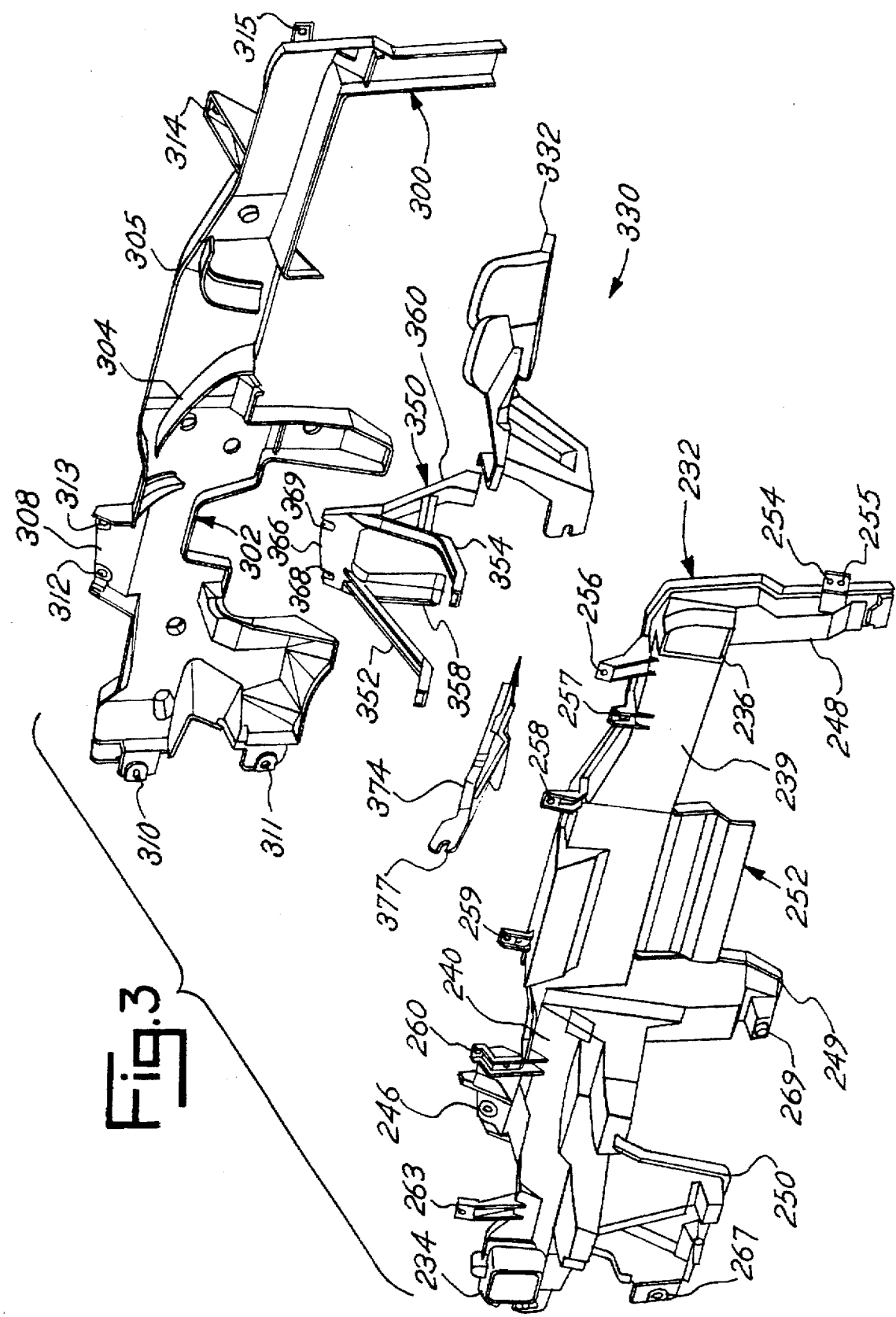

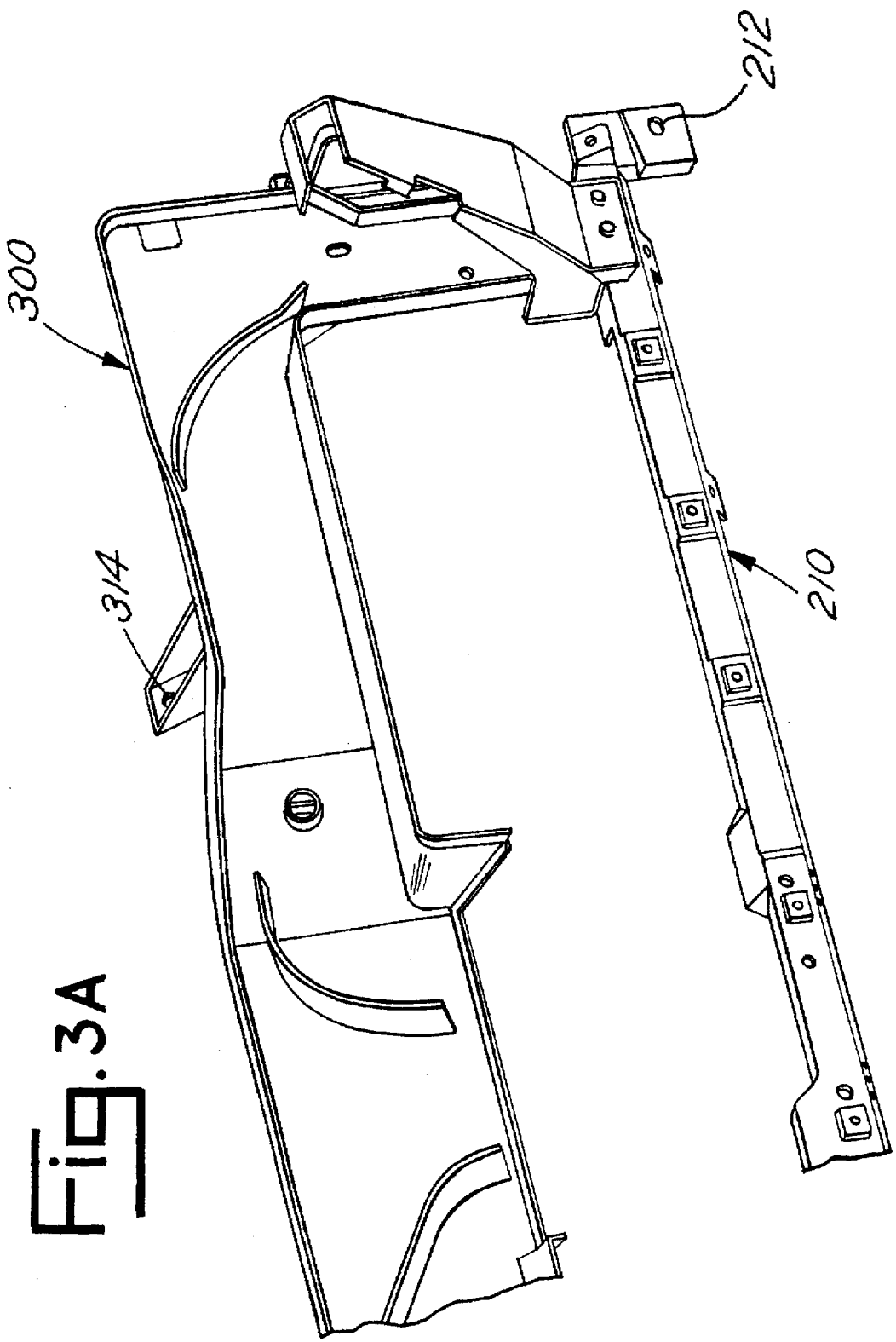

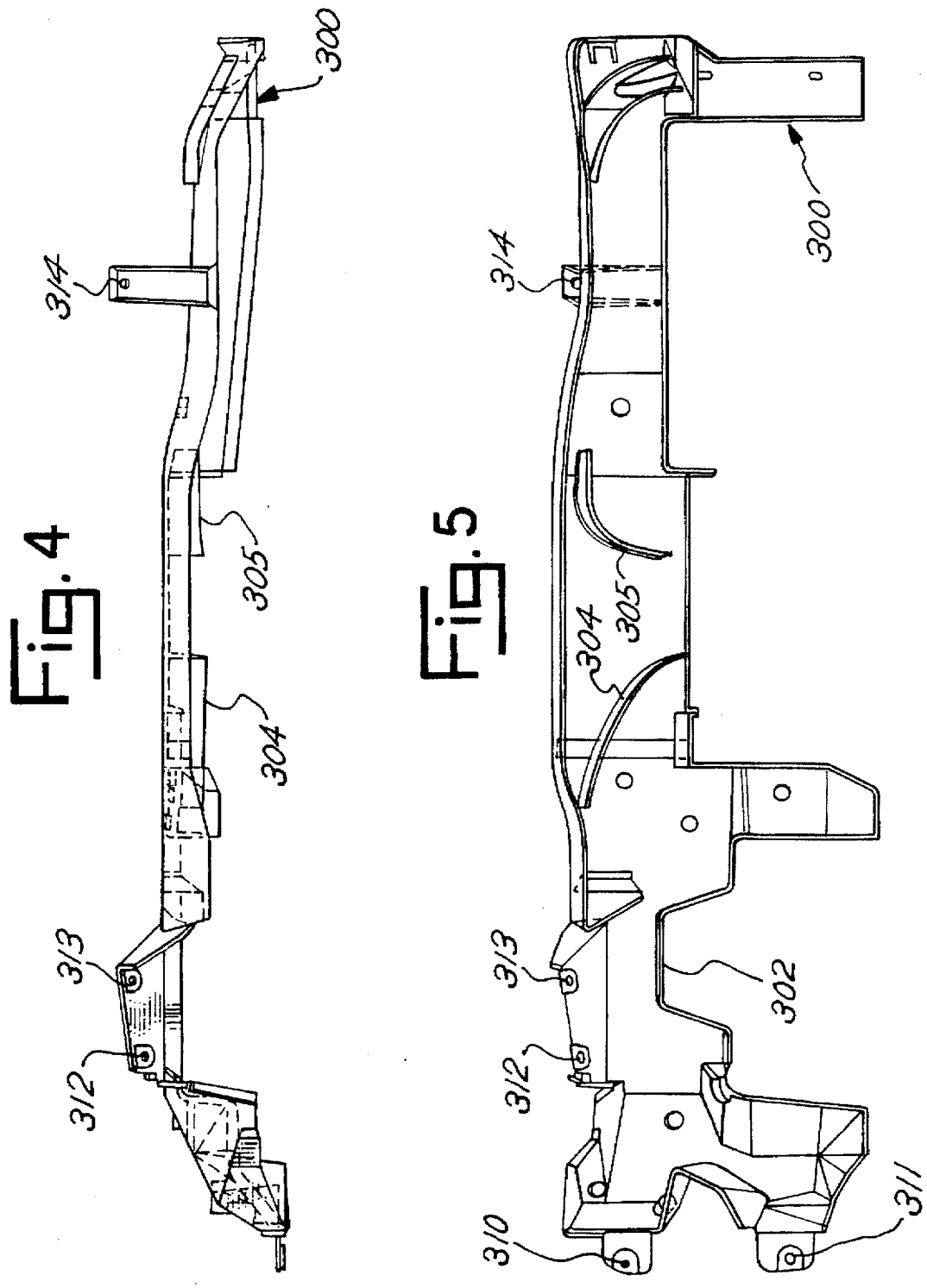

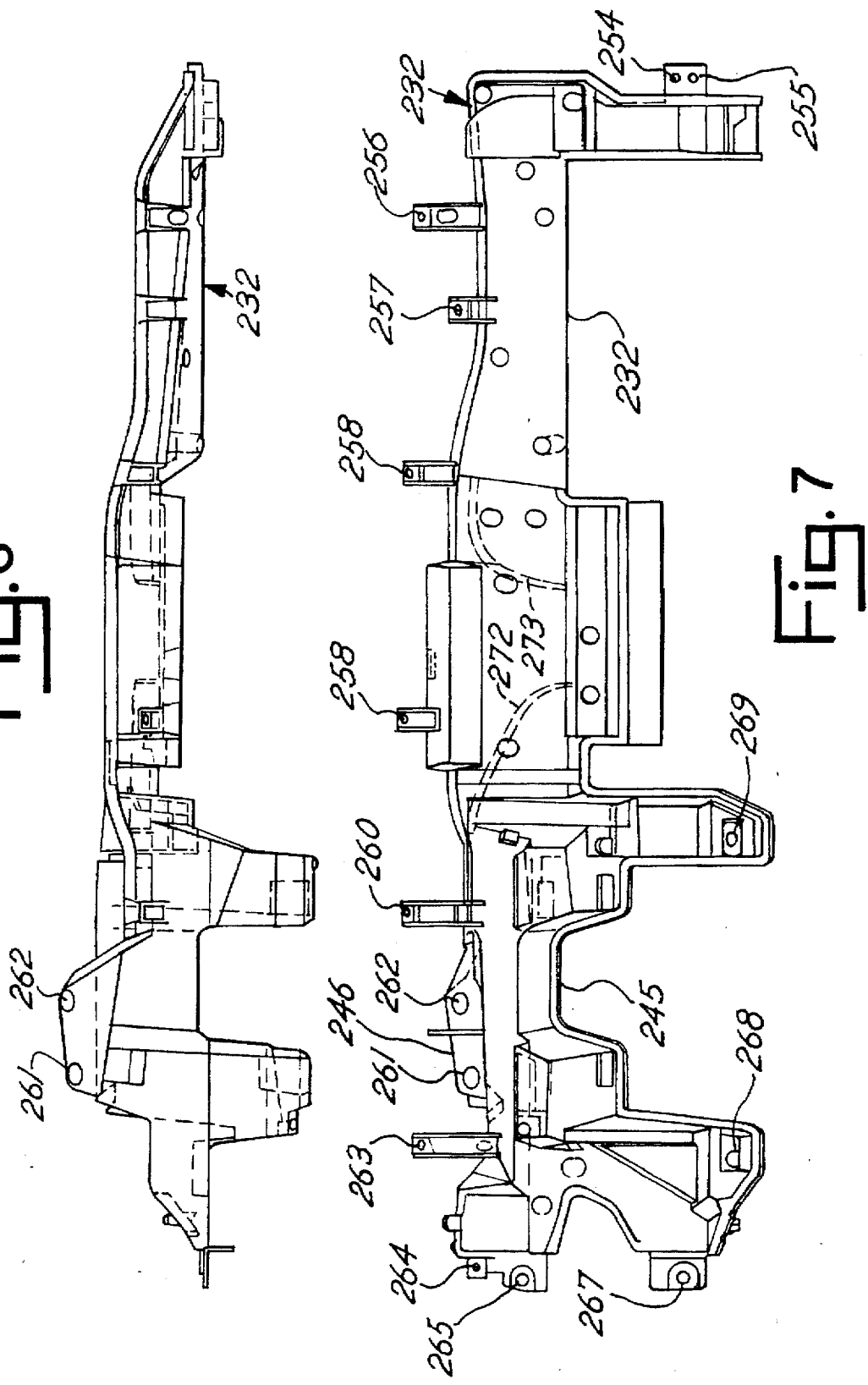

STRUCTURAL TWO-PIECE COMPOSITE INSTRUMENT PANEL CROSS-BEAM WITH INTEGRATED AIR DISTRIBUTION SYSTEM

This application is a continuation of application Ser. No. 08/227,773, filed Apr. 14, 1994 now abandoned.

FIELD OF THE INVENTION

This invention is directed to a vehicular assembly incorporating knee bolsters and supporting a steering column. More particularly, the vehicular assembly also includes means for reinforcing the knee bolsters, supporting an instrument panel and forming ducts and air inlets of an air distribution system.

BACKGROUND OF THE INVENTION

Cross vehicular assemblies incorporating ducts for a vehicular air distribution system suitable for fabrication from thermal plastic material have been disclosed in the past. Such ducts are disclosed in U.S. Pat. Nos. 4,791,964 (Van Kirk-issued Dec. 20, 1988) and U.S. Pat. No. 4,811,760 (Van Kirk et al.-issued Mar. 14, 1989).

Vehicular knee bolsters also have been disclosed in the past. For example, a knee bolster for a glove compartment incorporating some plastic parts is disclosed in U.S. Pat. No. 4,662,649 (Ikeda et al.-issued May 5, 1987).

Vehicular beams for defining air supply channels and for supporting an instrument panel and an airbag also have been disclosed in the past. One such beam is disclosed in U.S. Pat. No. 4,759,568 (Paefgen et al.-issued Jul. 26, 1988).

U.S. Pat. No. 4,733,739 (Lorenz et al.-issued Mar. 29, 1988) describes an instrument panel that is somewhat structural, in part supports a steering column and has integrated air ducts. However, the Lorenz patent does not describe or suggest the concept of increasing the steering column natural frequency or preventing the steering column from rotating in a crash.

In spite of the improvements described in the foregoing patents, there is no known prior art plastic cross vehicular assembly with sufficient strength and reliability for reinforcing knee bolsters, defining air distribution ducts, supporting an instrument panel and supporting a steering column in a way that controls its frequency characteristics.

Accordingly, an object of the present invention is to provide an improved plastic cross vehicular assembly for reinforcing knee bolsters, defining ducts for an air distribution system, supporting an instrument panel and controlling the frequency characteristics of a steering column that decreases weight, costs and the probability of squeaks and rattles, while increasing reliability and ease of assembly.

Another object of the invention is to provide an improved passive restraint system for supporting knee bolsters, air bags and a steering column.

SUMMARY OF THE INVENTION

One aspect of the invention comprises a multifunctional structural cross vehicular beam for a motorized vehicle. The vehicle is directionally controlled by a steering column having a predetermined first bending mode frequency. The vehicle comprises a cowl, as well as frame members defining opposed sides of a compartment for one or more passengers and a driver. The compartment includes an instrument panel. In such an environment, the beam preferably comprises an integrally formed first structural means extending across substantially the entire width of the compartment between the frame members of the vehicle and between the cowl and the instrument panel. The structural means defines a first support means for supporting the instrument panel and second support means for supporting a knee protection assembly for protecting the knees of said passenger or driver in the event of a collision. Third support means are employed for supporting an air bag mechanism and fourth support means are employed for supporting the steering column. Integrally formed second structural means extend across substantially the entire width of the passenger compartment between the frame members and between the cowl and the instrument panel. The second structural means is adapted to comate with the first structural means for producing one or more cavities for defining channels of an air distribution system for the passenger compartment. First fastening means are used for securely comating the first means to the second means. Second fastening means are used for securely connecting the comated first structural means and second structural means to the frame members so that the first bending mode frequency of the combination of the steering column and the beam is different from the first bending mode frequency of the steering column alone in order to improve the structural feel of the steering column.

Another aspect of the invention provides for a method of fabricating a vehicular beam obtained from a mold. The beam defines one or more cavities that form channels of an air distribution system including air outlets for a vehicle. The vehicle includes an air blower, a cowl and frame members defining opposed sides of a compartment for one or more passengers and a driver. The compartment includes an instrument panel. The method preferably comprises the step of molding a front portion and rear portion of the beam capable of extending substantially across the entire width of the compartment between the frame members of the vehicle. One or more of the beam cavities temporarily is fitted with air vanes. An air blower is mounted to the beam, and the air distribution through the air outlets is tested. The vanes are adjusted in order to achieve the desired air distribution through the air outlets. The mold then is reformed to create the vanes in their adjusted form. The portion of said beam defining the vanes then is remolded with the vanes integrally formed with that portion of the beam. The front portion is fastened to the rear portion of the beam. The beam is placed across substantially the entire width of said compartment of the vehicle between the frame members and between the cowl and the instrument panel. The beam then is fastened to the frame members, and the beam is fastened to the instrument panel.

Additional features and advantages of the invention will be more apparent from the following detailed discussion of certain preferred embodiments.

BRIEF DESCRIPTION OF DRAWINGS

The detailed description of certain preferred embodiments of the invention is provided below with reference to the accompanying drawings, wherein the same reference numeral is used for a given feature in all figures.

FIG. 1 is an exploded, perspective view of a multifunctional cross vehicular assembly made in accordance with a preferred embodiment of the invention as viewed by looking toward the cowl of a vehicle incorporating the assembly.

FIGS. 2A and 2B are enlargements of FIG. 2.

FIG. 3 is enlarged, exploded, perspective view of a portion of the assembly shown in FIG. 1.

FIG. 3A is an enlarged, perspective view of a portion of the assembly shown in FIG. 1 assembled for mounting to an A-pillar.

FIG. 4 is an enlarged top plan view of the front support member shown in FIGS. 1-3.

FIG. 5 is a front elevational view of the front support member shown in FIG. 4.

FIG. 6 an enlarged top plan view of the rear support member shown in FIG. 1-3.

FIG. 7 is a front elevational view of the rear support member shown in FIG. 6.

DETAILED DESCRIPTION OF CERTAIN PREFERRED EMBODIMENTS

Figure 1A:
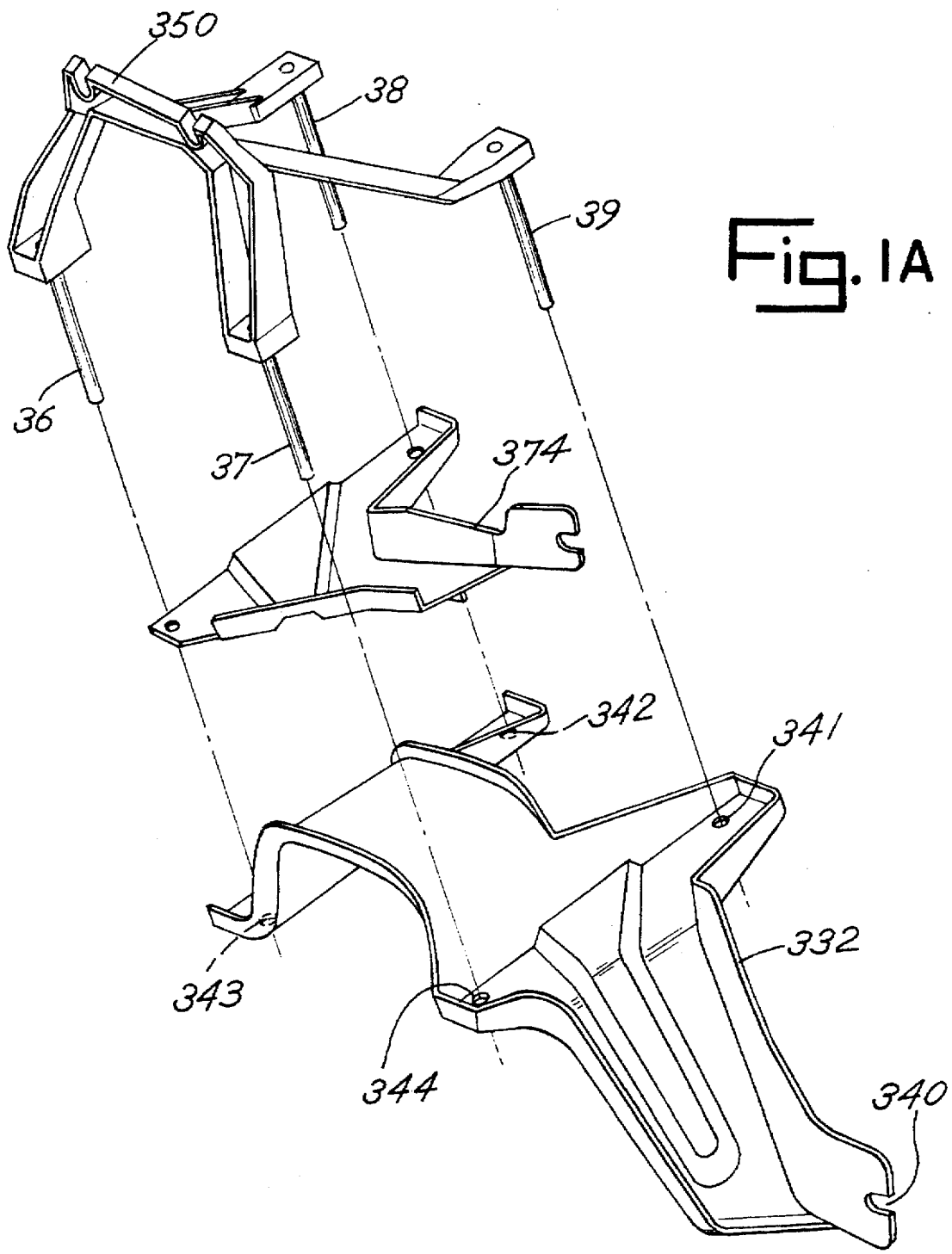
FIG. 1A is an enlarged, perspective view of certain components shown in FIG. 1.

Referring to the drawings, a preferred form of a multi-functional cross vehicular assembly made in accordance with the present invention is adapted for use in connection with a motorized vehicle (not shown) incorporating a steering column 30 (FIG. 2), a cowl 50 (FIG. 1) and A-pillars 52 and 54 (FIG. 1) that support a windshield (not shown). Steering column 30 includes mounting holes 32, 32A, 33 and 33A. Cowl 50 forms a portion of the body of the vehicle. A-pillars 52 and 54 define the opposed sides of a compartment 60 that holds a driver (not shown) and a passenger (not shown).

Referring to the drawings, a multifunctional cross vehicular assembly made in accordance with a preferred form of the present invention basically comprises a knee bolster assembly 80 (FIG. 2), an instrument panel 130, a reinforcement assembly 150, a beam duct assembly 230, and a fastening assembly 330.

Figure 2:
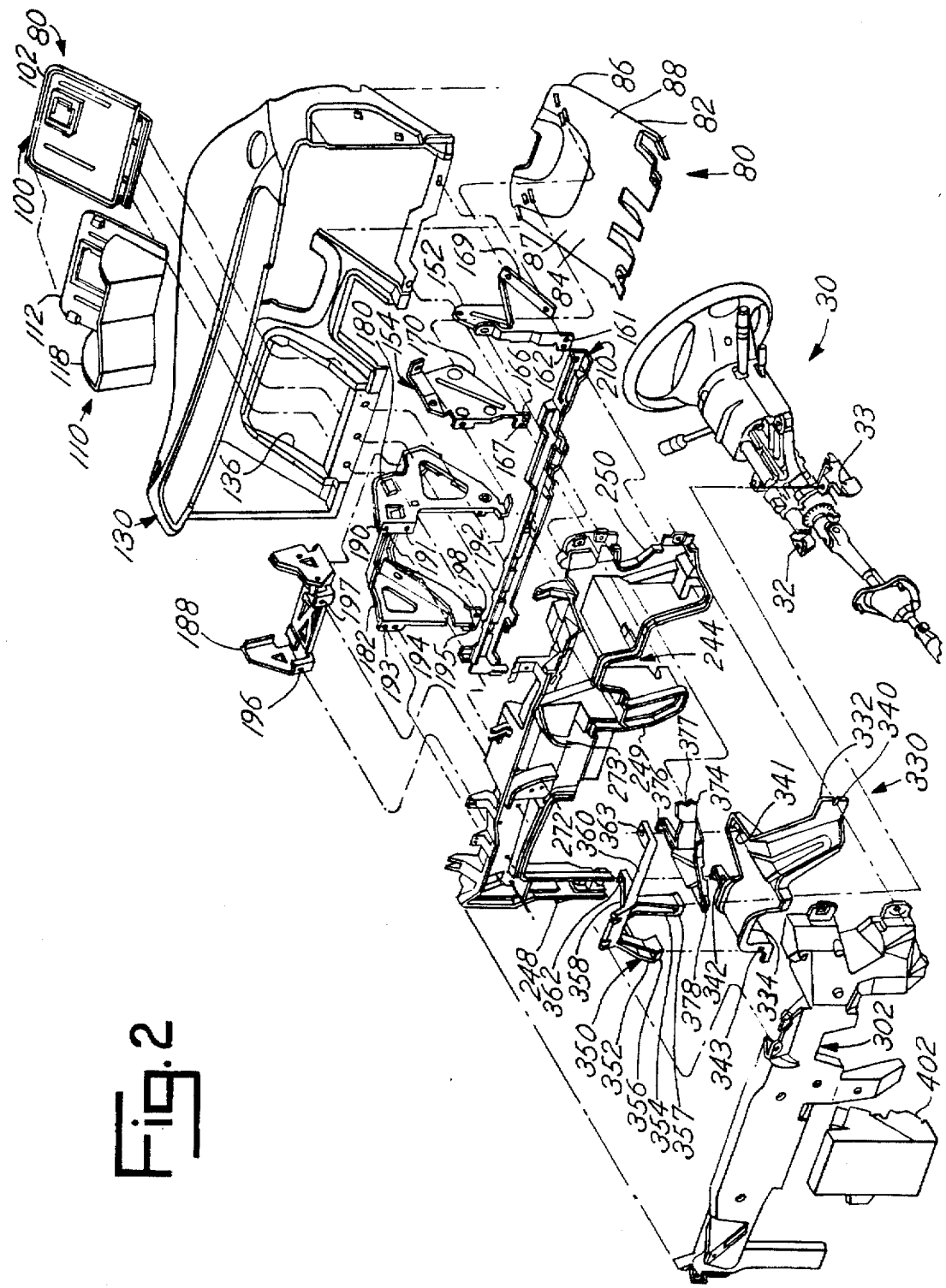
FIG. 2 is an exploded, perspective view of a multifunctional cross vehicular assembly made in accordance with a preferred embodiment of the invention as viewed by looking away from the cowl of a vehicle incorporating the assembly.
Figure 2A:
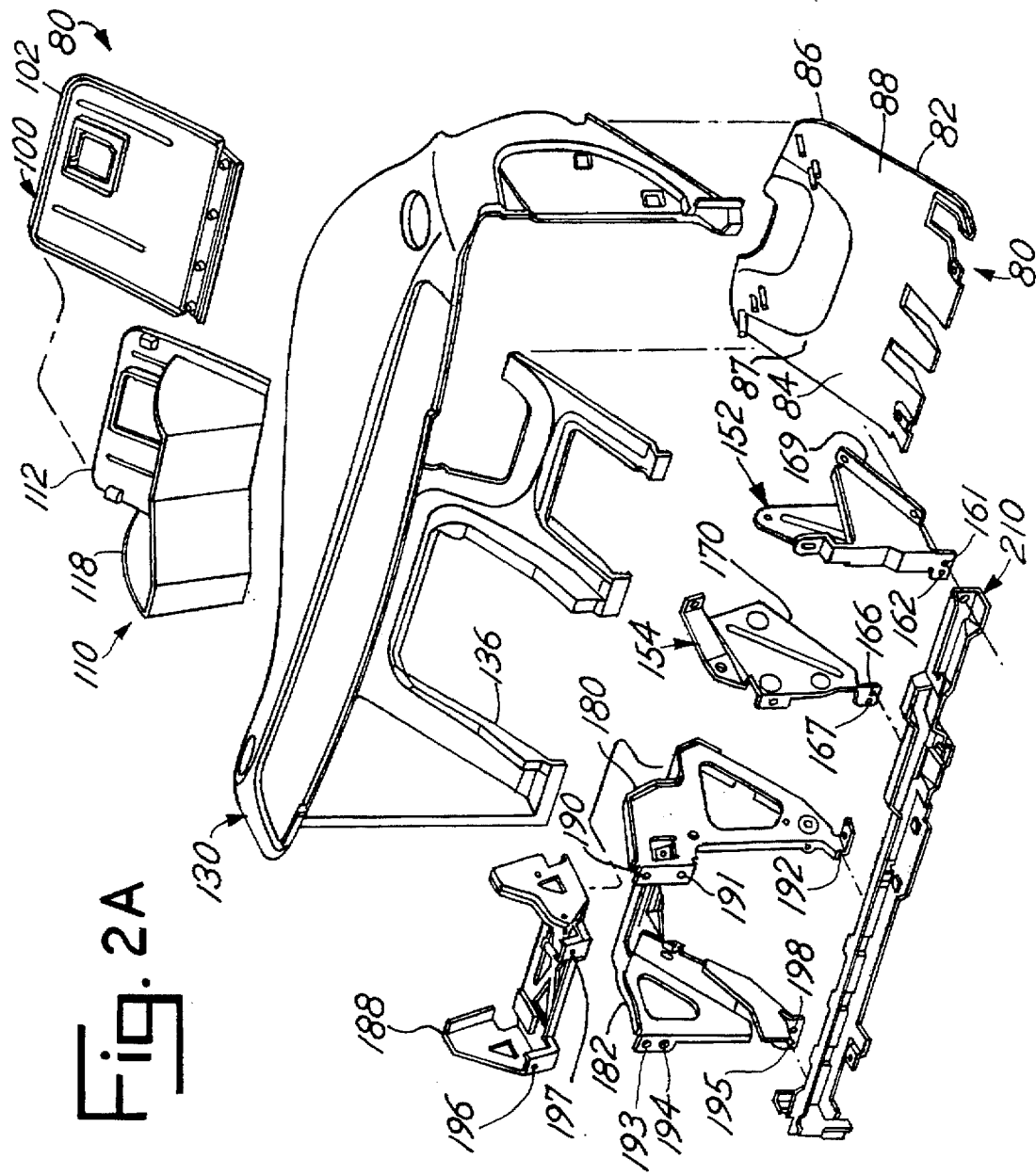

Referring to FIGS. 1 and 2, knee bolster assembly 80 comprises a driver bolster 82 (FIG. 2), including a 1.5-2.0 millimeter thick steel plate 86 that is backed with a plate 84 having lateral edge portions 87 and 88.

Referring to FIGS. 1 and 2, knee bolster assembly 80 also includes a passenger bolster 100 that is incorporated into a glove compartment 110 having a cover 112. The cover supports a 1.5-2.0 millimeter thick steel plate 102 (FIG. 2). Glove compartment 110 is rotatably supported on a piano hinge along lower edge 116 (FIG. 1) in order to give a passenger of the vehicle access to a glove compartment liner 118 that forms a drawer-like compartment.

Referring to FIGS. 1 and 2, instrument panel 130 includes foam padding 134 that is fitted between a vinyl cover 132 and a hard plastic 2.5 millimeter thick shell 136.

Referring to FIGS. 1 and 2, reinforcement assembly 150 includes steel driver reinforcement members 152 and 154 having fastening holes 156-157 and 159-167 and defining slanted faces 169-170 that support and comate with edge portions 86 and 87 of rear plate 84. Faces 169-170 support the periphery of plate 86 in the event of a collision.

Referring to FIGS. 1 and 2, reinforcement assembly 150 includes steel passenger reinforcement members 180 and 182 defining slanting edges 184 and 186 adapted to support the periphery of passenger bolster plate 102 in the event of a collision. As shown in FIGS. 1 and 2, assembly 150 also includes a steel bracket 188 for supporting an airbag mechanism (not shown). Members 180, 182 and 188 have attachment holes 190-198 (FIG. 2).

Assembly 150 also includes a supporting flange 210 made of stamped steel having mounting holes 212-216.

Referring to FIGS. 1-3 and 6-7, beam duct assembly 230 includes a rear duct member 232 that defines air distribution inlets 234 and 236. Member 232 includes rear channel members 239 and 240 that define portions of ducts for the air distribution system of the vehicle. Member 232 also defines a glove compartment opening 242 (FIG. 1) for receiving glove compartment 110, as well as a steering column opening 244 (FIG. 2) formed by an arch 245 (FIG. 7) that is positioned around steering column 30 (FIG. 2) of the vehicle. A cowl attachment tab 246 provides a means of attaching duct member 232 to cowl 50. Member 232 also includes solid frame sections 248-250, a panel section 252 and fastening holes 254-269 arranged as shown. Vanes 272-273 control the distribution of air through ducts 234 and 236. Member 232 is integrally injection molded from SMC plastic having a nominal thickness of 2.5 millimeters in the portions that form ducts 239 and 240 and a nominal thickness of 2.5 millimeters in the portions that form frame sections 248-250. This is an important feature that reduces weight and increases reliability and quietness.

Referring to FIGS. 1-5, beam duct assembly 230 also includes a front duct member 300 that incorporates an arch 302 (FIG. 5) that comates with arch 245 (FIG. 7). Member 300 also defines air deflection vanes 304-305 that balance the air distribution between various ducts such as 234 and 236. Vanes 304-305 (FIGS. 1, 3 and 5) comate with vanes 272-273 (FIGS. 2 and 7). Front duct member 300 is integrally injection molded from SMC plastic having a nominal thickness of 2.5 millimeters. This is an important feature that reduces weight and increases reliability and quietness. Member 300 includes mounting holes 310-315 (FIGS. 3-5). Holes 312 and 313 are formed on a flange 308 (FIGS. 4 and 5) that comates with flange 246 (FIGS. 6 and 7) in order to facilitate attachment to cowl 50.

Rear member 232 and front member 300 are adapted to comate in order to form the ducts of the air distribution system of the vehicle. Members 232 and 300 are bonded together by a plastic adhesive to form a light, rigid, rattle-free beam that provides sufficient support for bolster assembly 80. The preferred adhesive is a polyamide hot-melt, although other adhesives, such as 2 part epoxy-urethane sealer, are acceptable.

Referring to FIGS. 1-3, fastening assembly 330 comprises a steel steering column support 332 defining an arch 334 (FIG. 2) that fits into opening 244 and defining fastening holes 340-344. Assembly 330 also includes a steel brace 350 defining legs 352 and 354 bearing fastening holes 356 and 357 that comate with holes 343 and 344 (FIG. 2). Brace 350 also includes legs 358 and 360 bearing fastening holes 362 and 363. Brace 350 also includes a cross beam 366 bearing fastening slots 368 and 369 that are fastened to cowl 50 and flanges 246 and 308.

Assembly 330 also includes a steel reinforcement 374 bearing fastening holes 376-378.

A conventional blower assembly 402 is fit into panel section 252 (FIG. 2).

The various components as shown in the figures are assembled in the following manner. Referring to FIGS. 1-7, rear duct member 232 is bonded to front duct member 300 using adhesive in the manner previously described in order to form a beam. The remaining components are assembled and fastened with bolts in the manner shown by the phantom lines in FIGS. 1A and 2.

In the event of a collision, if the driver or passenger are not wearing lap seat belts, the forward motions of their upper bodies are intended to be restrained by an airbag or upper torso belt. The forward motion of their legs are intended to be restrained by driver bolster 82 and passenger bolster 100 which absorb kinetic energy from the knees of the driver and passenger, respectively. The amount of kinetic energy absorbed can be carefully controlled because the bolsters are fabricated from uniform steel plates 86 and 102 that can be calibrated with relative ease. According to an important feature, reinforcement members 152, 154, 180 and 182, as well as beam duct assembly 230, transfer force from the knee bolsters without absorbing substantial kinetic energy from the knees of the driver or passenger in the event of a collision. The applicants have discovered that this result can be accomplished even though the duct assembly is fabricated from SMC plastic.

According to another important feature, duct assembly 230, reinforcement assembly 150 and the body of the vehicle, including cowl 50, are rigidly interconnected, and transfer force from the body of the vehicle through duct assembly 230 and reinforcement assembly 150 to the knee bolster plates 86 and 102 during a collision. Such transfer of force stabilizes the position of the knee bolster plates relative to the body of the vehicle during a collision. Kinetic energy from the knees of the driver and/or passenger is absorbed by the knee bolster plates. By fabricating and fastening the components in the manner described, the knee bolster plates are enabled to cushion and limit the movement of the knees of the driver and passenger in the event of a collision.

Steering column 30 is assembled to brace 332 by using bolts to align hole 33 with hole 344, hole 32 with hole 343, hole 32a with hole 342 and hole 33a with hole 341. The manner in which the steering column is supported by assembly 330 and duct assembly 230 is an important feature. Steering column 30 is attached with four studs 36–39 (FIG. 1A) through holes 32, 32A, 33 and 33A (FIG. 2B). Studs 36–39 are two-way studs which are installed from the outside after beam parts 232 and 300 have been assembled. Bracket assembly 330 is adhesively bonded within the beam, before the two beam halves 232 and 300 are bonded at points 310, 311, 312, 313 and at the four holes in the beam through which the studs are installed. Guide pins through the four holes are also used to align assembly during bonding.

As shown in FIG. 3A, flange 210 is mounted to front duct member 300 so that hole 212 is aligned for mounting to A-pillar 52. Duct assembly 230 is fastened to A-pillars 52 and 54 by bolts which extend through holes 254, 255, 212, 265 and 267 (FIG. 7). Member 300 is fastened to A-pillars 52 and 54 by bolts that extend through holes 310, 311 and 212 (FIG. 3). Thus, the beam duct assembly extends across the entire width of the passenger compartment, the outer dimensions of which are defined by A-pillars 52 and 54 (FIG. 1). A bolt is extended through fastening holes 261, 368 and 312; another bolt is extended through holes 262, 369 and 313; and another bolt is extended through hole 314 in order to rigidly attach beam 230 and assembly 330 to cowl 50. As a result of these attachments, steering column 30 is securely held to A-pillars 52 and 54, as well as cowl 50, by beam duct assembly 230. By using this arrangement, the first bending mode frequency of the combination of steering column 30, beam duct assembly 230 and assembly 330 is greater than the first bending mode frequency of the body of the vehicle alone and also is different from the engine idle excitation frequency. In addition, the first bending mode frequency of the combination of steering column 30, duct assembly 230 and assembly 330 is higher than the first bending mode frequency of steering column 30 alone. In addition, the first bending mode frequency of the combination of steering column 30 and beam duct assembly 230 is different from the first bending mode frequency of steering column 30 alone. Moreover, the first bending mode frequency of the combination of the steering column 30 and duct assembly 230 is higher than the first bending mode frequency of steering column 30 alone. Those skilled in the art appreciate that these bending mode frequency relationships are an important advance in the art which substantially improves the feel of the steering wheel from the viewpoint of the driver.

Vanes 272–273 and 304–305 are used to balance the distribution of air through ducts 234 and 236 (FIG. 3) in the following manner. Initially, rear and front members 232 and 300 of assembly 230 are molded without any vanes. Temporary vanes are then inserted into members 232 and 300 in the approximate position of vanes 272–273 and 304–305. Members 232 and 300 then are temporarily joined together, and blower assembly 402 (FIG. 2) is fitted to panel section 252 and is turned on so that air is distributed through ducts 239 and 240 and out duct openings 234 and 236. The air distribution through the ducts is measured, and the vanes are adjusted to achieve the desired air distribution.

After the proper configuration of the vanes has been determined, the mold for members 232 and 300 is cut so that vanes 272 and 273 are integrally formed with member 232 and vanes 304–305 are integrally formed with member 300. The vanes, of course, are fabricated so that they comate when members 232 and 300 are bonded together. That is, vane 272 comates with vane 304 and vane 273 comates with vane 305.

The remolded members 232 and 300 with the integral vanes then are bonded together in the manner previously described, fastened between A-pillars 52 and 54 and fastened to cowl 50 in the manner previously described. The instrument panel then is affixed to duct assembly 230 in the manner shown by the phantom lines in FIGS. 1 and 2.

The various preferred versions or embodiments of the invention described in detail above are intended only to be illustrative of the invention. Those skilled in the art will recognize that modifications, additions and substitutions can be made in the various features and elements of the invention without departing from the true scope and spirit of the invention. The following claims are intended to cover the true scope and spirit of the invention.

What we claim is:

1. A multifunctional structural cross vehicular beam in a motorized vehicle directionally controlled by a steering column having a predetermined first bending mode frequency, said vehicle comprising a cowl and frame members defining opposed sides of a compartment for one or more passengers and a driver, said compartment comprising an instrument panel, said beam comprising:

integrally formed plastic first structural means extending across substantially the entire width of said compartment between said frame members of said vehicle and between said cowl and said instrument panel for defining an arch for receiving the steering column, first support means for supporting said instrument panel, second support means for supporting a knee protection assembly for protecting the knees of said passenger or driver in the event of a collision, third support means for supporting an air bag mechanism, and fourth support means for supporting said steering column;

integrally formed plastic second structural means extending across substantially the entire width of said passenger compartment between said frame members and between said cowl and said instrument panel and adapted to comate with said first structural means for producing one or more cavities for defining channels of an air distribution system for said passenger compartment;

first fastening means for securely comating said first structural means to said second structural means;

second fastening means for securely connecting said comated first structural means and second structural means to said frame members; and metallic third fastening means located over said arch inside said beam and securely comated with said steering column, with said cowl, with said beam and with at least one of said frame members for inhibiting said steering column from rotating upward toward said windshield in the event of a collision and for improving the structural feel of said steering column.

2. A beam, as claimed in claim 1, wherein a first bending mode frequency of a combination of said steering column and said beam is higher than a first bending mode frequency of said steering column alone.

3. A beam, as claimed in claim 1, wherein said first fastening means comprises an adhesive.

4. A beam, as claimed in claim 1, wherein said frame members include body A-pillars, wherein said second fastening means comprises means for securely connecting said comated first structural means and second structural means to said A-pillars and wherein said third fastening means comprise steel.

5. A beam, as claimed in claim 1, wherein said second structural means defines opening means for receiving air for distribution to said compartment.

6. A beam, as claimed in claim 1, wherein said first structural means defines opening means for distributing air to said compartment.

7. A beam, as claimed in claim 1, wherein said third fastening means is bonded to said beam.

8. A beam, as claimed in claim 1, wherein a first bending mode frequency of a combination of said steering column and said beam is different from a first bending mode frequency of said steering column alone.

9. A beam, as claimed in claim 1, wherein a first bending mode frequency of a combination of said steering column and said beam is greater than a first bending mode frequency of said body.

10. A multifunctional structural cross vehicular beam in a motorized vehicle directionally controlled by a steering column having a predetermined first bending mode frequency, said vehicle comprising a cowl and frame members defining opposed sides of a compartment for one or more passengers and a driver, said compartment comprising an instrument panel, said beam comprising:

integrally formed plastic first structural means extending across substantially the entire width of said compartment between said frame members of said vehicle and between said cowl and said instrument panel for defining an arch for receiving the steering column, first support means for supporting said instrument panel, second support means for supporting a knee protection assembly for protecting the knees of said passenger or driver in the event of a collision, third support means for supporting an air bag mechanism, and fourth support means for supporting said steering column;

integrally formed plastic second structural means extending across substantially the entire width of said passenger compartment between said frame members and between said cowl and said instrument panel and adapted to comate with said first structural means for producing one or more cavities for defining channels of an air distribution system for said passenger compartment;

first fastening means for securely comating said first structural means to said second structural means;

second fastening means for securely connecting said comated first structural means and second structural means to said frame members; and metallic third fastening means located over said arch inside said beam and securely comated with said steering column, with said cowl, with said beam and with at least one of said frame members for inhibiting said steering column from rotating upward toward said windshield in the event of a collision and for improving the structural feel of said steering column, wherein said third fastening means comprises:

a metallic steering column support mounted over said arch inside said beam and securely comated to at least one of said frame members, and a metallic brace mounted over said steering column support inside said beam and extending through said steering column support and said beam on opposite sides of said arch, said brace being securely comated to said cowl and said steering column.

* * * * *